United States Patent

[11] 3,631,787

[72] Inventor  Terushige Shimizu
              Tokyo, Japan
[21] Appl. No. 859,367
[22] Filed     Sept. 19, 1969
[45] Patented  Jan. 4, 1972
[73] Assignee  Nippon Kogaku K.K.
              Tokyo, Japan
[32] Priority  Sept. 24, 1968
[33]          Japan
[31]          43/82759

[54] DIAPHRAGM SETTING DEVICE FOR DIAPHRAGM BLADES
     4 Claims, 6 Drawing Figs.
[52] U.S. Cl.................................................. 95/64 R
[51] Int. Cl................................................... G03b 9/02

[50] Field of Search.................................. 95/64 R

[56]                  References Cited
              UNITED STATES PATENTS
3,282,188  11/1966  Spiessal....................... 95/64
3,512,463  4/1970   Kiper........................... 95/64 A

*Primary Examiner*—Joseph F. Peters
*Attorney*—Harry G. Shapiro

ABSTRACT: A device for positioning the blades of an optical diaphragm by pivotally connecting each diaphragm blade to a first rotating ring and slidably connecting each diaphragm blade to a second rotating ring by means of a cam groove in the diaphragm blade. Mutually opposed rotation of the first and second rotating rings pivots each diaphragm blade to provide the desired setting for the diaphragm aperture.

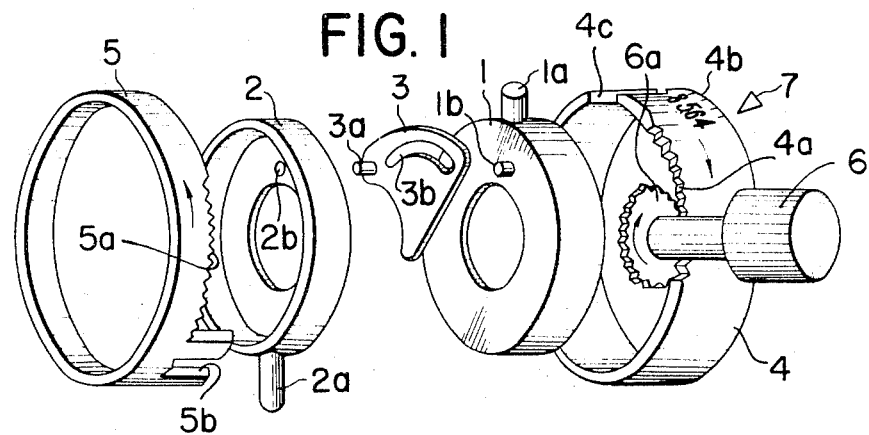
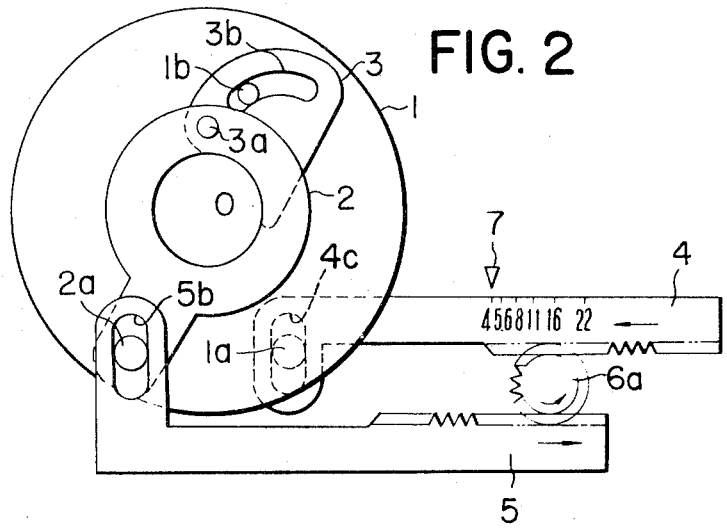
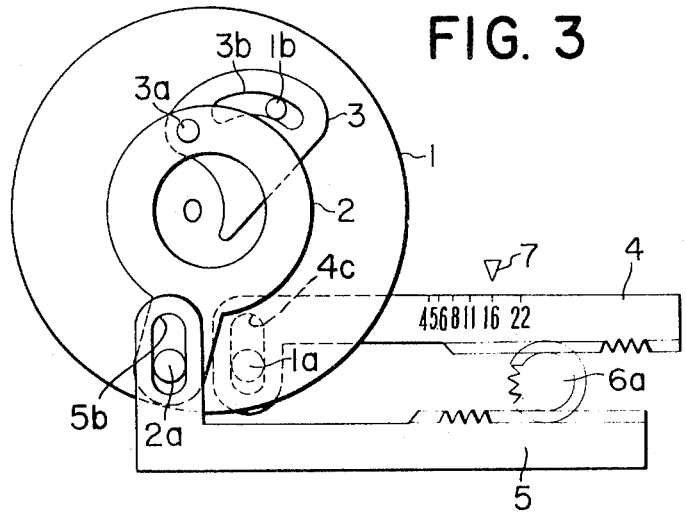
INVENTOR.
TERUSHIGE SHIMIZU
BY Harry S. Shapiro
ATTORNEY

DIAPHRAGM SETTING DEVICE FOR DIAPHRAGM BLADES

This invention provides a device for setting the diaphragm blades of a diaphragm in a camera.

Commonly used optical diaphragms are usually formed from several pivotally mounted diaphragm blades. Each of the diaphragm blades is positioned by an operating pin which is angularly displaced within a cam groove in the diaphragm blade, thereby pivoting each diaphragm blade to enlarge or narrow the aperture of the diaphragm to a desired F value.

This method of positioning the diaphragm blades provides very accurate diaphragm settings, as long as the angle of rotation for the operating pin is relatively large in comparison to the corresponding pivoted movement required for the diaphragm blades to change the diaphragm aperture. However, when a small angle of rotation of the operating pins requires a correspondingly large change in the diaphragm aperture, accurate adjustment of the diaphragm becomes difficult. Furthermore, in such circumstances, the adjusting accuracy of the apparatus deteriorates because of rapid wear to the components. The rapid wear occurs because the cam slot in each diaphragm blade must be highly curved to provide the relatively large amount of diaphragm blade pivot for the limited angular displacement of the operating pin and, therefore, the movement of the operating pin within the highly curved cam groove tends to wear the cam groove.

The principal object of this invention is to reduce the wear of the cam groove and simultaneously improve the accuracy of the diaphragm aperture setting by increasing the distance between the operating pin and the rotational center of the diaphragm blade required to produce a predetermined diaphragm rotation angle, thereby reducing the curvature required for the cam groove.

The present invention will be more apparent from the following description referring to illustrative embodiments shown in the accompanied drawing, in which:

FIG. 1 shows an exploded view of an embodiment of a diaphragm assembly built in accordance with the present invention;

FIG. 2 shows a schematic view of the diaphragm assembly of FIG. 1;

FIG. 3 shows the diaphragm assembly of FIG. 2 after it has been actuated;

Figure 4:
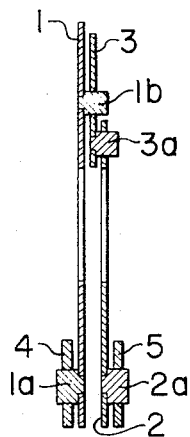
FIG. 4 shows a cross section of the diaphragm assembly shown in FIG. 1.

The first embodiment of this invention will be described with reference to FIGS. 1 through 4. In the drawings, 1 is a rotating ring which rotates around the center 0 and has a pin 1a fixed on its periphery and an operating pin 1b on its side face. Another rotating ring 2 rotates around the center 0 and has a pin 2a fixed on its periphery and a hole 2b in its side face. A diaphragm blade 3 has a cam groove 3b in which the pin 1b is fitted and a pin 3a to be fitted in the hole 2b. A scale ring 4 has gear toothed portion 4a on its side face, a diaphragm scale 4b on its periphery and a recess 4c in engagement with the pin 1a. A rack ring 5 has gear toothed portion 5a on its side face opposed to the toothed portion 4a of the scale ring and a recess 5b in engagement with the pin 2a. A manually operable knob 6 is coupled with a pinion 6a which is disposed between and meshes with the geared portions 4a and 5a. An index mark 7 is provided for aligning values of the diaphragm scale 4b.

Operation of the apparatus is as follows. When the pinion 6a is rotated in the direction of the arrow shown in FIG. 2, the scale ring 4 and the rack ring 5 rotate in opposite directions with respect to each other. Since recesses 4c and 5b are in engagement with the pins 1a and 2a, respectively, the rotating rings 1 and 2 also rotate in opposite directions with respect to each other, and, while so doing, the pin 1b provided on the rotating ring 1 and the pin 3a fitted in the hole 2b rotate in opposite directions with respect to each other to actuate the diaphragm blade 3.

Figure 6:
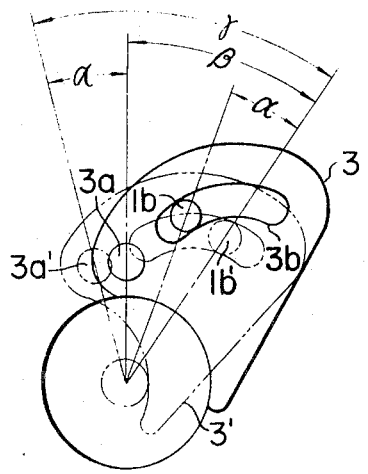
FIG. 6 shows the operation of the diaphragm blade of FIG. 1.
Figure 5:
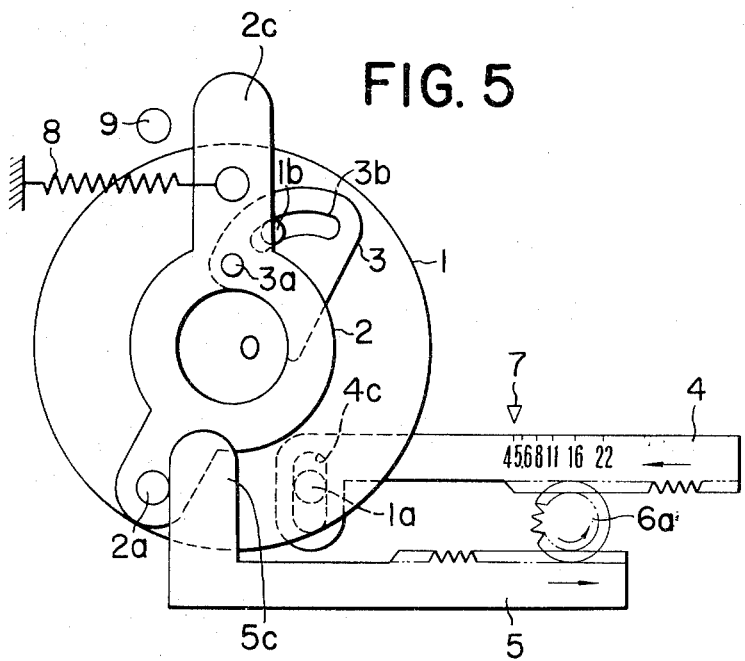
FIG. 5 shows a schematic view of an another embodiment of this invention.

FIG. 6 shows the rotation of the diaphragm blade. When the diaphragm is fully opened, the diaphragm blade 3 is at the position shown by the solid lines. When the diaphragm is stopped down to a desired F value, the diaphragm blade 3 comes to the position shown by two-dot chain lines and indicated as 3'. In a conventional diaphragm, pin 3a would remain stationary while pin 1b would move to position 1b'. Therefore, the relative angle between the pin 3a and the operation pin 1b in a conventional diaphragm is only $\beta°$ while the relative angle for the present embodiment is $\gamma°$, which is $\alpha°+\beta°$. In short, $\gamma°$ is greater than $\beta°$ by $\alpha°$.

This means that when the cam must be shifted a given amount, the amount of movement required between the cam groove and the operating pin to provide for the shift can be increased. This enables the cam to be shaped for easier operation, which also increases the accuracy of positioning.

I claim:

1. An iris diaphragm for an optical objective comprising a plurality of diaphragm blades, each of the blades having a pivotal pin and a camming slot; a pair of rings carrying said blades and coaxially rotatable, the first ring having a series of pin holes for pivotably supporting said pins and the second ring having a series of pins engageable with said camming slots; a gearing mechanism for simultaneously turning said first and second rings in directions opposite to each other; and means for adjusting the aperture of the diaphragm through said gearing mechanism.

2. An iris diaphragm according to claim 1, further comprising spring means for rotating one of said rings to the closed position of said blades; and stop means for stopping the rotation of said one of the rings at a preset position so that one of said rings is rotated along with the other of the rings until it is stopped by said stop means and thereafter the other of the rings is further rotated.

3. An iris diaphragm for an optical objective according to claim 1 wherein the second rotatable ring is operatively engaged with the diaphragm blades for swinging the diaphragm blades about their pivot points and the diaphragm blades are disposed between the first and second rings so that when the first and second rings are rotated in opposite directions to each other, through the gearing mechanism by the adjusting means, the diaphragm blades are rotated and simultaneously swung by the first and second rings to define the diaphragm aperture.

4. An iris diaphragm for an optical objective according to claim 1 wherein the gearing mechanism comprises a first rotatable member having a gear tooth section, a second rotatable member having a gear tooth section opposed to the gear tooth section on the first rotatable member, first means for interconnecting the first ring with the first rotatable member, second means for interconnecting the second ring with the second rotatable member, and a pinion engaging with the two gear tooth sections.

* * * * *